Aug. 12, 1941.  A. WAGNER  2,252,449
RAPID SHUTTER WINDING DEVICE FOR CAMERAS
Filed Aug. 4, 1939  2 Sheets-Sheet 1
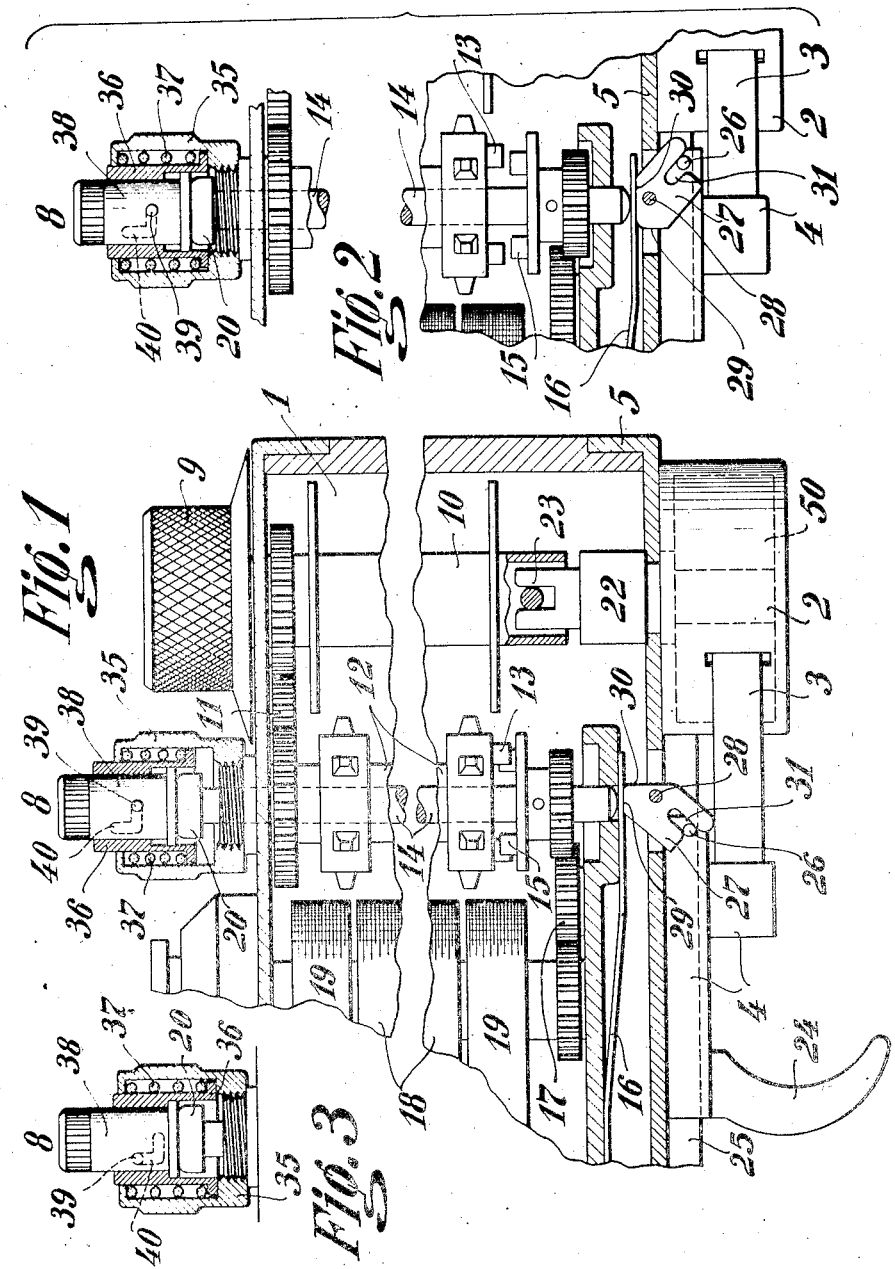
INVENTOR
*Adam Wagner*
BY
*Ivan E. A. Honigsberg*
ATTORNEY Aug. 12, 1941.  A. WAGNER  2,252,449
RAPID SHUTTER WINDING DEVICE FOR CAMERAS
Filed Aug. 4, 1939  2 Sheets-Sheet 2

INVENTOR
Adam Wagner
BY
Ivan E. A. Konigsberg
ATTORNEY

Patented Aug. 12, 1941

2,252,449

UNITED STATES PATENT OFFICE 2,252,449

RAPID SHUTTER WINDING DEVICE FOR CAMERAS

Adam Wagner, Wetzlar, Germany, assignor, by mesne assignments, to Frank Dumur, Lausanne, Switzerland Application August 4, 1939, Serial No. 288,370
In Germany August 19, 1938

8 Claims. (Cl. 95—57)

This invention relates to improvements in rapid shutter winding devices for cameras. Such devices are usually actuated by means of a pistol grip or the like arranged on the bottom of the camera and whereby by a simple pulling operation the shutter is rewound and the film advanced without necessitating moving the camera for the purpose of separately operating the rewinding knob. Thus the photographer may take a series of pictures in rapid succession. However, it has still been necessary to separately operate the shutter release. In other words for each exposure at least two hand operations are necessary. One, to actuate the rapid winder and another, to actuate the shutter release.

The object of this invention is to provide a rapid winder for cameras so arranged that only one operation is necessary in order to make an exposure and rewind the shutter and advance the film. To this end the invention is embodied in a rapid winder which per se is well known, it being in the form of a spring operated slide which is manually moved in one direction to effect the rewinding and then thereafter is retracted by a spring. This slide is in this invention connected to a member which, when the slide is moved to rewind, in turn positions the shutter release in a release-ready position. When the rapid winder is retracted, i. e. the rewinding operation has been accomplished, said member is moved into another neutral position and then the shutter release is automatically actuated to release the shutter.

The automatic release is in turn effected by a spring attachment secured to the ordinary release, the arrangement being such that when the rewinder is operated, the release spring is tensioned, and when the rewinder is retracted the release spring actuates the release.

It is a further object of the invention to arrange the automatic shutter release in such form that it may be readily attached to the existing manually operated shutter release and to provide means whereby the automatic shutter release may be positioned to permit manual shutter release. Another object is to arrange the rapid winder in such a manner that but very little change in the camera construction is required in order to accomplish the objects of the invention which is illustrated in the accompanying drawings in which Fig. 1 is a view of so much of a camera as is necessary to understand the invention, parts being in section and other parts being broken away or omitted. The parts are shown in their positions just after the rapid winder has been moved to rewind and to position the shutter release in ready-to-release position.

Fig. 2 is a similar view but shows only certain of the parts in shutter released positions.

Fig. 3 is a detail view of section showing the attachment to the shutter release.

Figure 4:
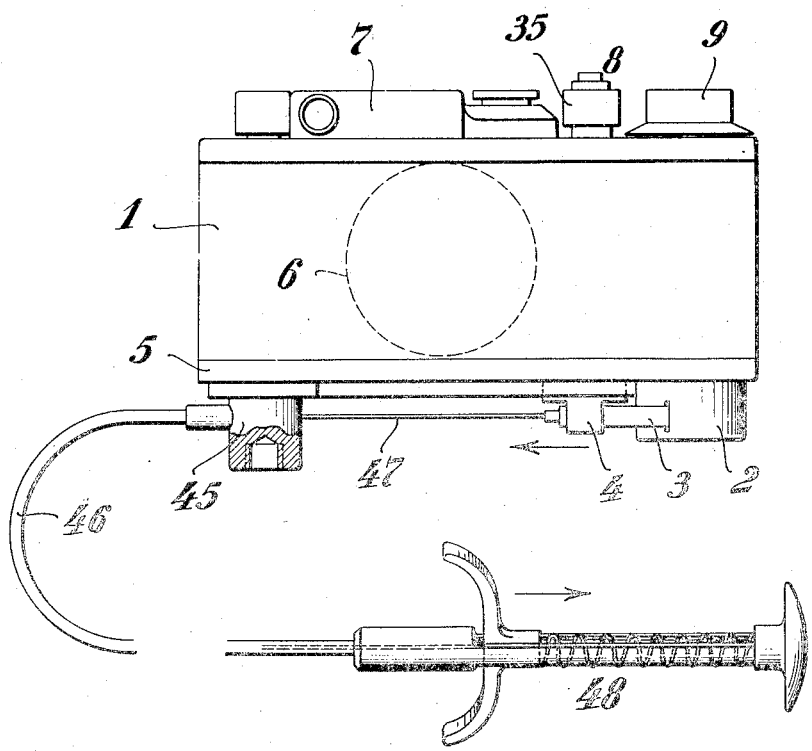
Fig. 4 is an outside view of a camera embodying the invention and equipped with a remote rapid winder control.

Referring first to Fig. 4 there is illustrated a well known type of miniature hand camera 1 having the rapid winder spring barrel 2 from which projects the spring winding band 3 attached to a sliding member 4. The rapid winder mechanism is usually sold as a separate attachment to the camera and is therefore mounted upon a detachable bottom 5 which replaces the usual camera bottom. All of this is known in the art. The camera mechanism is further identified by the objective 6, the finder 7, the shutter release mechanism at 8 and the shutter rewinding knob 9.

Referring now to Figs. 1–3 the camera mechanism is of the type disclosed in U. S. Patent No. 2,122,671, July 5, 1938 and in the following only such parts are described as are necessary for understanding the invention. The said rewinding knob 9 serves to rotate a film spool 10 upon which the exposed film is wound. The spool is by suitable gearing as at 11 operatively connected to the film advancing roller 12 which carries clutch members 13. The film roller 12 is hollow and through it extends the shutter release shaft 14 which carries other clutch members 15 adapted to engage the clutch members 13 when the release shaft is moved upwards by a flat spring 16 as shown in Fig. 1. Gearing as at 17 connects the release shaft 14 to the shutter. The latter is of the usual focal plane type consisting of two curtains operated in a well known manner by rotation of a curtain roller 18 and curtain reels 19. The release shaft 14 carries at the top the usual shutter release 20. These parts and their operation are well known and need only a brief description as follows.

The camera being loaded with film (not shown) and ready for operation the release 20 is pressed down against the spring 16 whereby to throw out the clutch 13—15. Thus the shutter curtains are free to be opened by operation of the usual shutter spring rollers not shown. Immediately after the exposure the spring 16 throws in the clutch. Then the knob 9 is manually operated to rotate the film spool 10 and through the gearing 11, the clutch 13—15 and the gearing at 17 the curtain roller 18 and the curtain drums 19 are rotated to rewind the shutter. Without the rapid winder attachment the film spool 10 rests upon a bearing secured to the usual detachable camera bottom, not shown. When however the rapid winder bottom 5 is attached to the camera, the film spool engages the shaft 22 of the spring winding mechanism by means shown at 23. Thus when the slide 4 and the spring band 3 are moved to rewind by pulling on the grip 24 which is a part of the slide 4, the barrel shaft 22 is rotated and in turn rotates the film spool. The shutter is then rewound as explained above. The slide 4 moves in a suitable guide 25 on the camera bottom 5. The description so far includes nothing novel over known rapid winding devices.

In the present invention the slide 4 carries a pin 26 which engages a slot 31 in and thereby operates a tumbler, dog or like member 27 which is pivoted at 28. The tumbler has two surfaces 29 and 30 adapted to be engaged by the spring 16 to hold the tumbler in either one of two positions as shown in Figs. 1 and 2.

In Fig. 1 the tumbler is in a position in which it has lifted the spring 16 and also lifted the shutter release shaft 14, the tumbler being held in dead center position by said spring. In Fig. 2 the tumbler has been rotated anticlockwise, the low surface 30 is uppermost and the spring 16 and the shutter release shaft 14 are lowered by means now to be described.

For the purpose of automatic release, there is secured to the top of the camera a housing 35 which encloses the shutter release 20. The housing contains a sleeve 36 which is under a steady downward pressure by a spring 37. The sleeve 36 in turn contains a movable button 38 adapted to be locked to the sleeve by means such as a pin 39 in the button and a rightangled slot 40 in the sleeve, the parts being shown in interlocked position in Figs. 1 and 2. When however the button 38 is rotated as in Fig. 3, the button is freely movable within the sleeve 36 and the pin 39 is then held against the end of the slot 40 by the aforesaid spring 16 on the bottom of the shutter release shaft 14.

The operation is as follows: Normally the button 38 will be locked to the sleeve 36. The latter and the shutter release shaft 14 will be in shutter released position because the spring 37 is stronger than the spring 16 so the latter is moved down upon the tumbler 27. The rapid winder is now in retracted position. When exposures are to be made, the photographer operates the rapid winder by taking hold of the grip 24 and operating the winder into the position shown in Fig. 1 thereby rotating the tumbler 27 clockwise to lift the spring 16, the shutter release shaft 14 and tensioning the spring 37, these parts now being in positions as in Fig. 1. Accidental or manual release is now prevented. Then the camera is aimed at the object and exposures are made by the photographer releasing the grip 24. The slide 4 is then retracted by the spring 50 in the spring barrel 2. The tumbler is rotated anticlockwise to release the spring 16 and the shaft 14 which now, under pressure of the spring 37 is moved down to throw out the clutch 13—15 and an exposure is made. Immediately thereafter the rapid winder is again drawn out whereby the shutter is rewound, the film advanced and the tumbler again moved into release preventing position and to tension the release spring 37 and so forth. The parts are so proportioned, designed and timed that the single manual operation of the rapid winder results in the two operations of throwing in the clutch 13—15 to effect rewinding and also to operate the tumbler to tension the release. The retraction of the rewinder by its spring 50 serves to move the tumbler out of the downward path of movement of the release shaft 14 so automatic release can take place.

The action is extremely rapid so that a series of rapid exposures can be made by the simple and single operation of pulling on the grip 24.

In Fig. 3 the button 38 has been operatively disconnected from the sleeve 36 which remains in depressed position within the housing 35 by means of the spring 37. Consequently the release may be manually operated as heretofore. When the rewinder is operated the shutter is rewound and the film advanced but the spring 37 is not tensioned. When the rewinder is retracted by its spring 50 the shutter release remains in its upper position as shown in Fig. 3 to be operated when the next exposure is to be made at the will of the operator. It may be said that Fig. 3 illustrates the release in single exposures position whereas Fig. 1 illustrates the release in series exposures position.

If desired, the rapid winder may be arranged for remote operation as so shown in Fig. 4. The camera bottom 5 may be provided with a nipple 45 for mounting the camera upon a tripod. A remote control cable 46 has its one end secured to the nipple for operating a link 47 secured to the slide 4, the other end of the cable is provided with the usual grip mechanism as at 48.

I claim:

1. In a camera, a shutter, a slidable shutter release shaft, a shutter release spring, means for operatively connecting said spring to said shaft to operate said shaft to release the shutter, shutter rewinding means, a rapid winder device on said camera for operating said rewinding means, a tumbler adapted to be rotated in one direction to operatively move said release shaft to position the same in shutter non-releasing position and to tension the said spring when said rewinding means are operated and adapted to be rotated in the opposite direction to permit said spring to actuate said release shaft to release the shutter, connections between said tumbler and said rapid winder device and means for operating the latter.

2. In a camera, a shutter, shutter releasing means, a spring for actuating the same to release the shutter, shutter rewinding means, manual means for operating the rewinding means, connections between said manual means and said spring for moving said shutter releasing means to non-releasing position prior to winding of the shutter and for tensioning said spring when the rewinding means are operated whereby to obtain immediate automatic operation of said releasing means when the rewinding operation has been completed and means for operatively connecting and disconnecting said spring from the said releasing means to provide for automatic or non-automatic operation thereof.

3. In a camera having an objective, a shutter, a movable shutter release in normal non-releasing position and mechanisms for rewinding the shutter and advancing the film between exposures; a controlling member, operative connections between said member and said shutter release, and operative connections between said member and the said mechanisms, means for moving said member in one direction to actuate said mechanisms and to move the shutter release into non-releasing position after an exposure, spring means for moving said member in the opposite direction after completion of the operations aforesaid, and a spring operatively connected to said shutter release and automatically tensioned when said release is moved into said non-releasing position for thereafter automatically releasing the shutter.

4. In a camera, a shutter, a movable shutter release, means for rewinding the shutter and advancing the film between exposures, a spring operatively connected to said shutter release, a control member, operating connections between the latter and said rewinding and advancing means, and between said member and said shutter release and spring, and means for operating said control member to actuate said operating connections to initially rewind the shutter and advance the film and subsequently to move said shutter release into non-releasing position after an exposure and tension said spring to automatically release the shutter thereafter.

5. In a camera, a shutter, a shutter release movable independent of the shutter, said release being in normal non-releasing position and mechanisms for rewinding the shutter and advancing the film between exposures; a trigger, operating connections between said trigger and said shutter release and mechanisms for actuating the same and for moving said release into non-releasing position upon manual operation of said trigger in one direction, spring means for moving said trigger in the opposite direction after completion of the operations aforesaid and a spring operatively connected to said shutter release and automatically tensioned when said release is moved into said non-releasing position for thereafter automatically operating said shutter release.

6. In a camera, a shutter, a movable shutter release in normal non-releasing position and mechanisms for rewinding the shutter and advancing the film between exposures; a controlling member, operative connections between the latter and said mechanisms, a tumbler and means on said controlling member to move said tumbler into engagement with the shutter release to position the same in non-releasing position and maintain it in such position at will, means for operating said controlling member to actuate said mechanisms and said tumbler, spring means to operate the controlling member to disengage said tumbler from said release and a spring, operatively connected to said shutter release and automatically tensioned when said release is moved into said non-releasing position, for thereafter automatically releasing the shutter.

7. A rapid winder attachment for a camera having an objective, a shutter, a movable shutter release operable independently of the shutter and means for rewinding the shutter and advancing the film between exposures; said attachment comprising a support, a tumbler thereon adapted to engage the shutter release to move the same into non-releasing position, connections on said support operatively engaging said rewinding and advancing means, a manually operable member on said support for actuating said connections and tumbler as aforesaid and a spring secured to the shutter release for automatically operating the same to release the shutter after completion of the rewinding and advancing operations.

8. An attachment according to claim 7 including means for operatively connecting and disconnecting the said spring from the shutter release to provide for automatic or non-automatic shutter release operations.

ADAM WAGNER.